United States Patent
Yamamoto et al.

(10) Patent No.: US 9,341,259 B2
(45) Date of Patent: May 17, 2016

(54) MULTISTAGE TRANSMISSION GEAR SHIFT OPERATION DEVICE, AND VEHICLE MOUNTED WITH SAME

(75) Inventors: Yasushi Yamamoto, Chigasaki (JP); Nobuyuki Iwao, Yokohamashi (JP)

(73) Assignee: ISUZU MOTORS LIMITED, Tokyo (JP)

( * ) Notice: Subject to any disclaimer, the term of this patent is extended or adjusted under 35 U.S.C. 154(b) by 181 days.

(21) Appl. No.: 14/235,940

(22) PCT Filed: Jul. 30, 2012

(86) PCT No.: PCT/JP2012/069309
§ 371 (c)(1),
(2), (4) Date: May 7, 2014

(87) PCT Pub. No.: WO2013/018753
PCT Pub. Date: Feb. 7, 2013

(65) Prior Publication Data
US 2014/0251053 A1 Sep. 11, 2014

(30) Foreign Application Priority Data
Aug. 1, 2011 (JP) .................. 2011-168611

(51) Int. Cl.
*F16H 61/34* (2006.01)
*F16H 59/04* (2006.01)
(Continued)

(52) U.S. Cl.
CPC .............. *F16H 59/04* (2013.01); *F16H 61/34* (2013.01); *F16H 61/36* (2013.01); *F16H 61/707* (2013.01); *F16H 63/08* (2013.01); *F16H 63/18* (2013.01); *Y10T 74/20159* (2015.01)

(58) Field of Classification Search
CPC ......... F16H 59/04; F16H 63/08; F16H 63/18; F16H 63/20; F16H 63/38; F16H 63/206; F16H 63/3408; F16H 2063/208; F16H 2063/3079; F16H 61/34; F16H 61/36; F16H 2061/2846

USPC .............. 74/473.25, 473.33, 473.36, 473.37, 74/333, 334, 337.5, 375
See application file for complete search history.

(56) References Cited

U.S. PATENT DOCUMENTS 2,273,068 A * 2/1942 Ross ................... F16H 61/0293
74/333
3,468,180 A * 9/1969 Lemke .................. F16H 59/042
74/473.24
(Continued)

FOREIGN PATENT DOCUMENTS

JP 3-46045 4/1991
JP 4-19947 2/1992
(Continued)

OTHER PUBLICATIONS

Chinese Office Action dated Feb. 12, 2015 in corresponding Chinese Patent Application No. 201280034986.3.
(Continued)

*Primary Examiner* — William Kelleher
*Assistant Examiner* — Jude Agendia
(74) *Attorney, Agent, or Firm* — Staas & Halsey LLP

(57) ABSTRACT

A gear shifting method and device of a multistage transmission in which gear shift of a main transmission and an auxiliary transmission is mechanically operated by operation of one shift lever The device is provided with: a cam mechanism that has a select operation output member and a shift operation output member, which separate, into shift operation and select operation for each direction, operation by operation of one shift lever that moves along at least one H-shaped shift pattern, a first cam groove that operates by the select operation, and operates a shift mechanism for the auxiliary transmission that shifts a shift fork for the auxiliary transmission, and a second cam groove that operates a select mechanism that selects a target shift fork from among a plurality of shift forks for the main transmission; and a shift mechanism for the main transmission that operates by the shift operation, and shifts the shift fork for the main transmission selected by the select operation.

4 Claims, 8 Drawing Sheets

(51) Int. Cl.
  *F16H 63/08* (2006.01)
  *F16H 63/18* (2006.01)
  *F16H 61/36* (2006.01)
  *F16H 61/70* (2006.01)

(56) References Cited

U.S. PATENT DOCUMENTS

| | | | | |
|---|---|---|---|---|
| 3,500,697 | A | * | 3/1970 | Schowalter ............. F16H 9/042 74/337.5 |
| 3,757,598 | A | * | 9/1973 | Van Dest ................ F16H 5/042 74/473.3 |
| 4,137,791 | A | * | 2/1979 | Kreitzberg ............. F16H 61/36 74/473.33 |
| 4,216,680 | A | * | 8/1980 | Hayashi .................... F16H 3/08 74/473.33 |
| 4,494,419 | A | * | 1/1985 | Inui ........................ F16H 63/20 74/473.1 |
| 5,067,362 | A | * | 11/1991 | Holdenried ............. F16H 63/44 74/335 |
| 7,610,829 | B2 | * | 11/2009 | Shintani ................ F16H 61/688 74/469 |
| 8,635,927 | B2 | * | 1/2014 | Akashi .................... F16H 61/28 74/473.36 |
| 2007/0044582 | A1 | | 3/2007 | Ono et al. |
| 2013/0228390 | A1 | * | 9/2013 | Tsuji ....................... F16H 61/22 180/333 |
| 2013/0245901 | A1 | * | 9/2013 | Arai ....................... F16H 61/688 701/51 |
| 2013/0305855 | A1 | * | 11/2013 | Skogward ............... F16H 61/32 74/89.14 |

FOREIGN PATENT DOCUMENTS

| | | |
|---|---|---|
| JP | 4-101064 | 9/1992 |
| JP | 7-12223 | 1/1995 |
| JP | 2008-8413 | 1/2008 |
| JP | 2010-19297 | 1/2010 |

OTHER PUBLICATIONS

International Search Report dated Oct. 16, 2012 in corresponding PCT/JP2012/069309.

* cited by examiner

PRIOR ART

MULTISTAGE TRANSMISSION GEAR SHIFT OPERATION DEVICE, AND VEHICLE MOUNTED WITH SAME

This application claims the benefit under 35 U.S.C. Section 371, of PCT International Application No. PCT/JP2012/069309, filed Jul. 30, 2012, and under 35 U.S.C. §119 of Japanese Application No. 2011-168611 filed Aug. 1, 2011, the contents of which are incorporated herein by reference.

TECHNICAL FIELD

The present invention relates to a gear shifting method of a multistage transmission in which a main transmission and an auxiliary transmission are mechanically operated to make a gear stage selectable by operation of one shift lever in the multistage transmission that is provided with the main transmission and the auxiliary transmission and in which the gear stage is made multi-staged with a combination of respective gear stages, a gear shifting operation device of the multistage transmission, and a vehicle having the same mounted thereon.

BACKGROUND ART

In recent years, large cars have employed a multistage transmission having the number of gear stages such as 12 stages and 16 stages. In such multistage transmission, there is employed a method in which not only the gear stage is increased to be made multi-staged, but is made multi-staged by the combination of an auxiliary transmission and a main transmission, which is called a splitter or a range. There are examples, not only in large cars but also in passenger cars, where an 8-speed transmission of 2×4 or 10-speed transmission of 2×5 is employed.

However, in a gear shifting operation device of the multistage transmission in which the auxiliary transmission is provided to be made multi-staged, a gear stage of the auxiliary transmission must also be changed simultaneously when a gear stage of the main transmission is changed, and a structure of the gear shifting operation device becomes complex.

Here, a conventional gear shifting operation device of a multistage transmission will be explained with reference to FIG. 8. It should be noted that here, there is exemplified a structure of a gear shifting operation device of 8-speed transmission of 2×4 as one example. A multistage transmission 2 includes a main transmission 3 and an auxiliary transmission 4, a main shaft 5 is provided with gear stages G1, G2, G3, and G4, and a sub-shaft 6 is provided with gear stages GH and GL. These gear stages are combinations of each counter gear with which counter shafts not shown are provided, and shift gears with which the main shaft 5 and the sub-shaft 6 are provided. In addition to this, the multistage transmission 2 is provided with coupling sleeves S1 to S3 and shift forks F1 to F3 which cause each gear to synchronize with the main shaft 5 or the sub-shaft 6.

In this multistage transmission 2, a first-speed stage is set as a combination of the gear stage G1 of the main transmission 3 and the gear stage GL of the auxiliary transmission 4, and the subsequent speed stages can be set as the following combinations sequentially from the first-speed stage: a second-speed stage is as the gear stage G2 and the gear stage GL; a third-speed stage is as the gear stage G3 and the gear stage GL; a fourth-speed stage is as the gear stage G4 and the gear stage GL; a fifth-speed stage is as the gear stage G1 and the gear stage GH; a sixth-speed stage is as the gear stage G2 and the gear stage GH; a seventh-speed stage is as the gear stage G3 and the gear stage GH; and an eighth-speed stage is as the gear stage G4 and the gear stage GH.

In this multistage transmission 2, the shift forks F1 to F3 oscillate, and the coupling sleeves S1 to S3 move on the main shaft 5 or the sub-shaft 6 in an axial direction thereof by the oscillation. The coupling sleeves S1 to S3 are then synchronously coupled to each gear stage, and thereby a gear is shifted.

A gear shifting operation device 1X is provided with: a shift mechanism 10X for main transmission; a shift mechanism 30X for auxiliary transmission; a select mechanism 40X for main transmission; an operation portion 50X for main transmission; a shift pattern 60X for main transmission; an operation portion 70X for auxiliary transmission; and a shift pattern 80X for auxiliary transmission.

Next, a gear shifting method of the multistage transmission 2 will be explained. First, the operation portion 70X for auxiliary transmission is operated, the shift mechanism 30X for auxiliary transmission is caused to operate, the shift fork F3 is oscillated, and the coupling sleeve S3 is synchronously coupled to the gear stage GL or the gear stage GH. Next, select operation of the operation portion 50X for main transmission is performed, the select mechanism 40X is caused to operate, and the shift fork F1 or F2 is operatively selected. Next, shift operation of the operation portion 50X for main transmission is performed, the shift mechanism 10X for main transmission is caused to operate, the selected shift fork F1 or F2 is oscillated, and the coupling sleeve S1 or S2 is synchronously coupled to each of the gear stages G1 to G4.

When the gear in the multistage transmission 2 a is shifted as described above, the operation portion 70X for auxiliary transmission for operating the auxiliary transmission 4 and the operation portion 50X for main transmission for operating the main transmission 3 are needed, and operation becomes very complicated. In addition, since the gear is shifted by using two operation portions, it becomes difficult to comprehend which gear stage is selected.

As measures against the above, there are a device and the like which are provided with a switch with which an auxiliary transmission can be operated, at a shift lever of an operation portion for main transmission, and in which, with the use of the switch, a shift mechanism for auxiliary transmission is operated by electronic control. Although operation can be performed by one operation portion in this device, operation of the main transmission and operation of the auxiliary transmission are divided also in the device, and complexity of the operation cannot be eliminated.

In relation to this, there is a range-type multistage transmission in which operation of a main transmission and an auxiliary transmission is performed by one shift lever (for example, refer to Patent Document 1). This device is the one that detects operation of a shift fork of the main transmission, and actuates, by a driving device, the shift fork that switches shift gears of the auxiliary transmission.

Also other than the device, a multistage transmission in which a gear stage of an auxiliary transmission is operated by a driving device, such as an electronically controlled actuator, is put into practical use. However, there have been problems of complicated electronic control, not being able to select an arbitrary gear stage, or the like.

PRIOR ART DOCUMENT

Patent Document 1: Japanese patent application Kokai publication No. 2010-19297

SUMMARY OF THE INVENTION

The present invention has been made in view of the above-described problems, and an object thereof is also to provide a gear shifting method of a multistage transmission, a gear shifting operation device of the multistage transmission, and a vehicle having the same mounted thereon in which operation of a main transmission and an auxiliary transmission can be mechanically performed in substantially the same shift pattern as a shift pattern of an ordinary manual transmission with one shift lever, operability is enhanced, and in which the device can be simplified.

A gear shifting method of a multistage transmission for achieving the above-described object, which is provided with a main transmission and an auxiliary transmission, and changes gear stages of both the main transmission and the auxiliary transmission by shift lever operation that moves along at least one H-shaped shift pattern, is characterized in that operation by one shift lever is separated into shift operation and select operation for each direction, a select operation mechanism that operates by the select operation selects a target shift fork for main transmission from among the plurality of shift forks for main transmission and shifts a shift fork for auxiliary transmission, and changes a gear stage of the auxiliary transmission, and that the shift operation mechanism that operates by the shift operation shifts the shift fork for main transmission selected by the select operation, and changes a gear stage of the main transmission.

As operation in the multistage transmission, there are included the select operation in which a shift lever is operated along a horizontal direction in an H-shaped shift pattern, and the shift operation in which the shift lever is operated along a vertical direction. Usually, in the select operation, a shift fork that suits a purpose is selected from among a plurality of shift forks, and in the shift operation, a coupling sleeve and the gear stage engage synchronously with each other by movement of the selected shift fork. According to the above-described method, the gear stage of the auxiliary transmission can be switched by the select operation of the shift lever. Therefore, operation of the main transmission and the auxiliary transmission can be mechanically performed by the one shift lever. In addition, gear shifting operation can be performed by a shift pattern substantially similar to an ordinary shift pattern of a manual transmission. Furthermore, since operation of the main transmission and the auxiliary transmission is mechanically performed by operation of the one shift lever, skip shift (for example, from a first-speed stage to a fifth-speed stage etc.) can be performed, and an arbitrary gear stage can always be selected. The number of gear stages of the multistage transmission operated by the gear shifting operation device is preferably an even number.

A gear shifting operation device of a multistage transmission for achieving the above-described object, which is provided with a main transmission and an auxiliary transmission, and shifts gear stages of both the main transmission and the auxiliary transmission by operation of a shift lever that moves along at least one H-shaped shift pattern, is configured to be provided with: a separation mechanism that separates operation by one shift lever into shift operation and select operation for each direction; a select operation mechanism that operates by the select operation, selects a target shift fork for main transmission from among the plurality of shift forks for main transmission, and shifts a shift fork for auxiliary transmissions; and a shift operation mechanism that operates by the shift operation, and shifts the shift fork for main transmission selected by the select operation.

According to this configuration, the separation mechanism separates, into the select operation, a horizontal direction of the shift lever that moves along the H-shaped shift pattern, and separates, into the shift operation, a vertical direction thereof, the select operation mechanism that operates by the separated select operation performs selection of a shift fork of the main transmission, and shift of the gear stage of the auxiliary transmission, the shift operation mechanism that operates by the shift operation operates the shift fork, and can shift the gear stage of the main transmission. Therefore, switching (Low<=>High) of the auxiliary transmission can be performed by the shift lever that switches the main transmission, and conventionally complicated shifting operation can be made easy.

In addition, in the above-described gear shifting operation device of the multistage transmission, the select operation mechanism is provided with: a unit operating a select mechanism that selects a target shift fork for main transmission from among the plurality of shift forks for main transmission; and a unit operating a shift mechanism that shifts a shift fork for auxiliary transmission, and the select operation mechanism is configured to simultaneously actuate the unit operating the select mechanism and the unit operating the shift mechanism so that when the shift fork for auxiliary transmission is shifted to a gear stage of a high-speed side, the shift fork for main transmission used for a gear stage of a low-speed side is selected, and when the shift fork for auxiliary transmission is shifted to a gear stage of a low-speed side, the shift fork for main transmission used for the gear stage of a high-speed side is selected.

In addition to that, in the above-described gear shifting operation device of the multistage transmission, the select operation mechanism includes a cam mechanism, and is provided with: a first cam groove that causes the cam mechanism to operate a shift mechanism for auxiliary transmission that shifts the shift fork for auxiliary transmission; and a second cam groove that causes the cam mechanism to operate a select mechanism that selects the shift fork for main transmission.

According to these configurations, the shift operation of the auxiliary transmission and the select operation of the main transmission can be simultaneously performed. The gear shifting operation device is configured so that a select operation direction of the main transmission is reversely actuated simultaneously when gear shift of the auxiliary transmission is performed by the select operation. As a result, the shift fork for main transmission of the low-speed side can be selected at the time of shift-up of the auxiliary transmission, and the shift fork for main transmission of the high-speed side can be selected at the time of shift-down of the auxiliary transmission.

When this select operation is explained in detail, the cam mechanism operates by the select operation of the shift lever, and the first cam groove and the second cam groove simultaneously operate. The guide member and the follower which have been provided at the shift mechanism for auxiliary transmission along the first cam groove operate, and the shift mechanism for auxiliary transmission operates so as to cause the coupling sleeve and the gear stage to be synchronously engaged with each other via the shift fork for auxiliary transmission. Simultaneously with the operation, the guide member and the follower which have been provided at the select mechanism for main transmission along the second cam groove operate, and the select mechanism for main transmission can select a shift fork. Consequently, since switching of the auxiliary transmission that had been conventionally performed by an electronically controlled actuator or the like can be performed by direct input of the shift lever, simplification of control and reduction in cost can be achieved. The cam mechanism may be a flat cam or a solid cam (cylindrical cam).

A vehicle for achieving the above-described object is configured to have mounted thereon the above-described gear shifting operation device of the multistage transmission.

According to this configuration, since one shift lever is operated by a shift pattern substantially similar to the shift pattern of the ordinary manual transmission, and gear shifting operation of the main transmission and of the auxiliary transmission can be performed, operability can be enhanced. Additionally, since gear shift is mechanically performed, skip shift from the first-speed stage to the fifth-speed stage can be performed, and a driver can select an arbitrary gear shift stage. In addition to that, since electronic control is not required, the device is simplified, and manufacturing cost of the device can be made low.

According to the present invention, operation of the main transmission and the auxiliary transmission can be mechanically performed in substantially the same shift pattern as the shift pattern of the ordinary manual transmission with one shift lever, operability is enhanced, and complexity of the device can be avoided.

BRIEF DESCRIPTION OF THE DRAWINGS

FIG. 4(a) is the view showing a select operation, and FIG. 4(b) is the view showing a shift operation.

FIG. 6(a) is the diagram showing a shift pattern of a shift lever, FIG. 6(b) is the view showing a select operation of the shift lever, and FIG. 6(c) is the view showing gear shift to the first-speed stage.

FIG. 7(a) is the diagram showing a shift pattern of the shift lever, FIG. 7(b) is the view showing a select operation of the shift lever, and FIG. 7(c) is the view showing gear shift to the eighth-speed stage.

DESCRIPTION OF EMBODIMENTS

Figure 8:
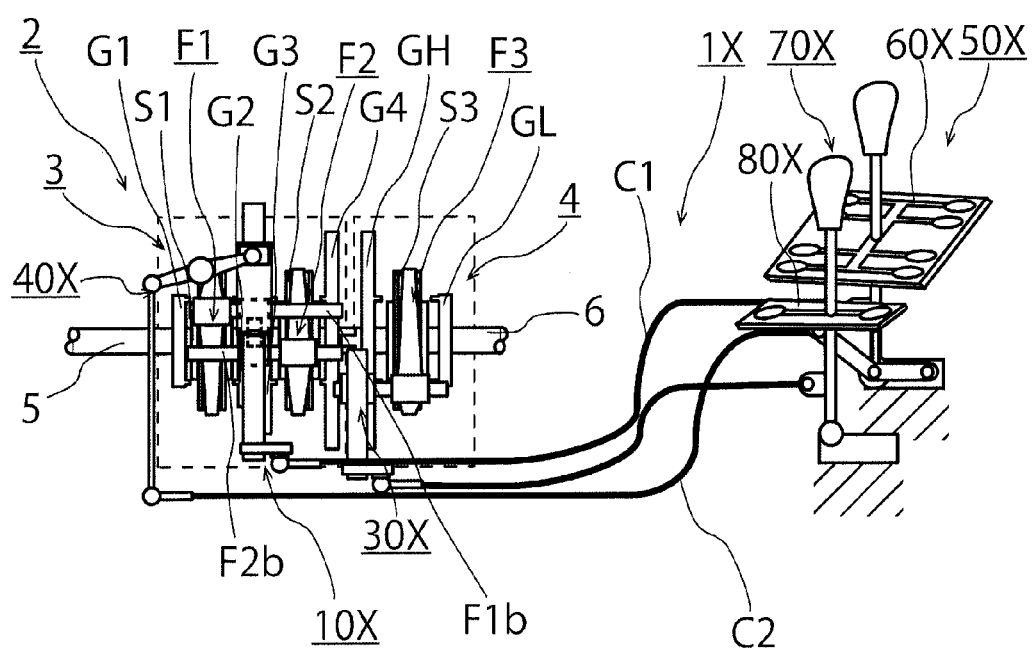
FIG. 8 is a view showing a conventional gear shifting operation device.

Hereinafter, there will be explained a gear shifting method of a multistage transmission, a gear shifting operation device of the multistage transmission, and a vehicle having the same mounted thereon of an embodiment according to the present invention, with reference to drawings. It should be noted that the same symbol is attached to the same configuration and operation as a conventional gear shifting operation device 1X shown in FIG. 8, and that the explanation thereof will be omitted. In addition, although a multistage transmission with 8 speeds of 2×4 is explained as an example in the embodiment according to the present invention, the gear shifting operation device of the present invention may be a multistage transmission provided with a main transmission and an auxiliary transmission, for example, a 10-speed transmission of 2×5, etc., and the number of gear stages is not limited. Furthermore, a reverse gear for reverse driving may be provided. Moreover, the gear shifting operation device of the present invention can be used also for an automatic multistage transmission.

Figure 1:
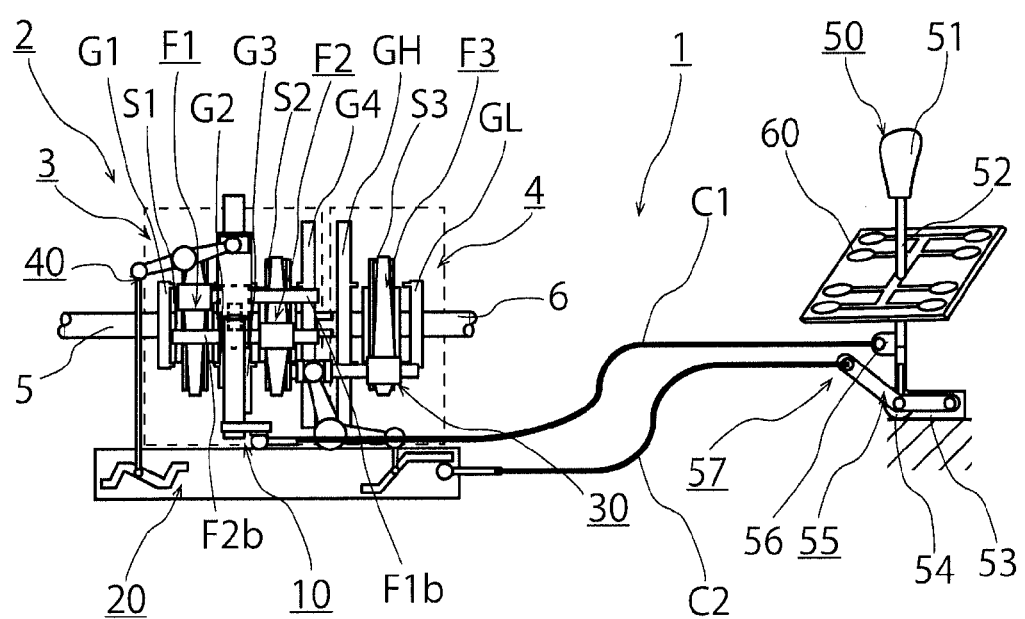
FIG. 1 is a view showing a gear shifting operation device of a first embodiment according to the present invention.

A gear shifting operation device 1 of an embodiment according to the present invention will be explained with reference to FIGS. 1 and 2. As shown in FIG. 1, the gear shifting operation device 1 is provided so that gear stages G1 to G4 of a main transmission 3 of a multistage transmission 2, and gear stages GH and GL of an auxiliary transmission 4 are changed. The gear shifting operation device 1 is provided with: a shift mechanism 10 for main transmission (shift operation mechanism); a cam mechanism (select operation mechanism) 20; a shift mechanism 30 for auxiliary transmission; a select mechanism 40; an operation portion 50; and a shift pattern 60. In addition, the shift mechanism 10 for main transmission and the operation portion 50 are connected to each other via a push-pull cable C1 for shifting, and the cam mechanism 20 and the operation portion 50 are connected to each other via a push-pull cable C2 for selection. For connection between the shift mechanism 10 for main transmission and the operation portion 50, and connection between the cam mechanism 20 and the operation portion 50, a push-pull cable is not necessarily used since operation of the operation portion 50 can be transmitted to the shift mechanism 20 for main transmission and the cam mechanism 20.

Figure 2:
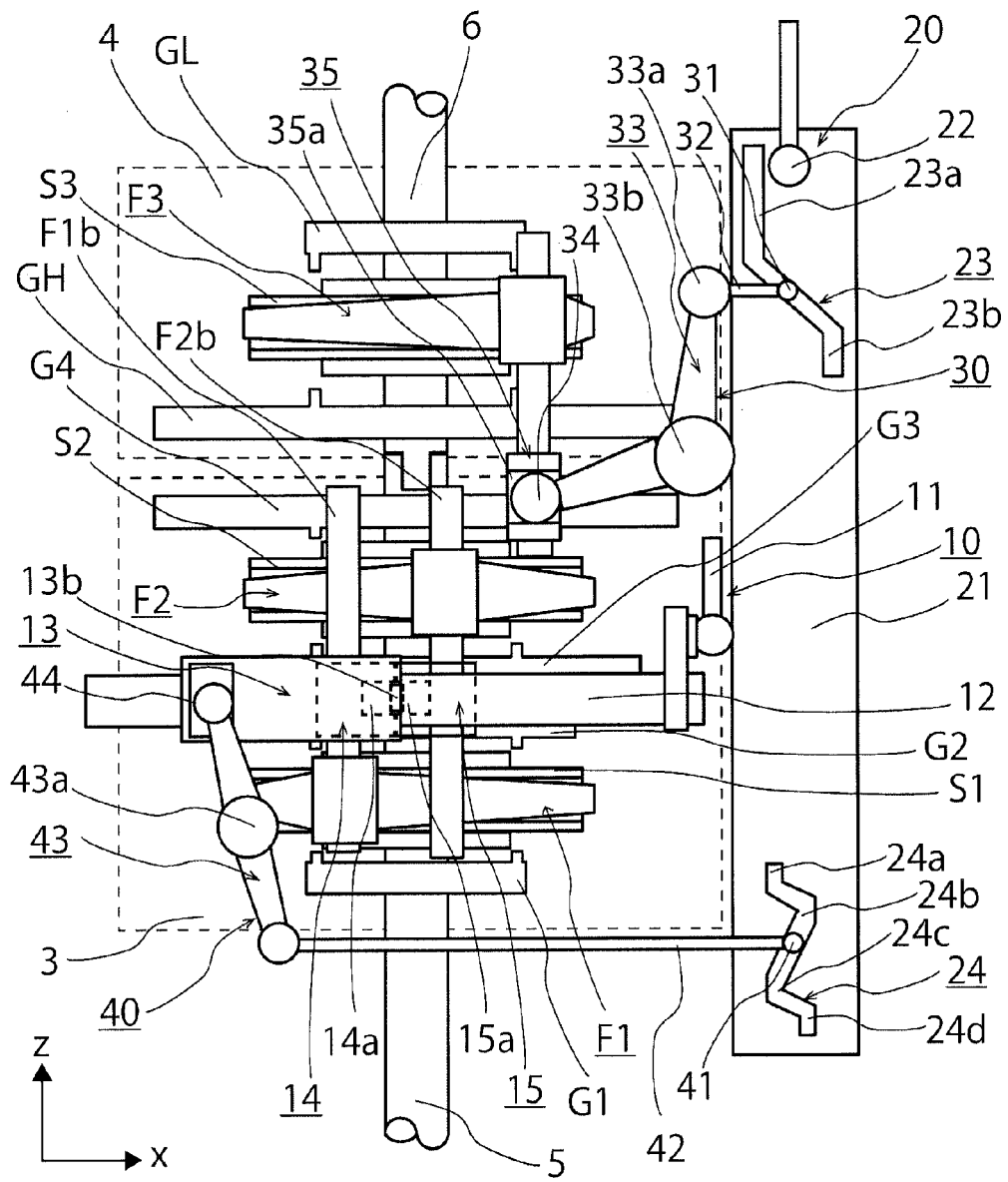
FIG. 2 is a plan view showing a part of FIG. 1.

As shown in FIG. 2, the shift mechanism 10 for main transmission is provided with: a shift operation input portion 11; a shift arm 12; a shift select lever 13; a first shift block 14; and a second shift block 15. Operation of a shift operation output member 56 is transmitted via the push-pull cable C1 for shifting and the shift operation input portion 21, and the shift arm 12 operates in an x-direction, which is a vertical direction of FIG. 2. By this operation, a shift fork F1 or a shift fork F2 is oscillated via the shift select lever 13, the shift block 14 or 15, each gear stage is synchronously coupled to a coupling sleeve S1 or S2, and thus a gear is shifted.

Figure 3:
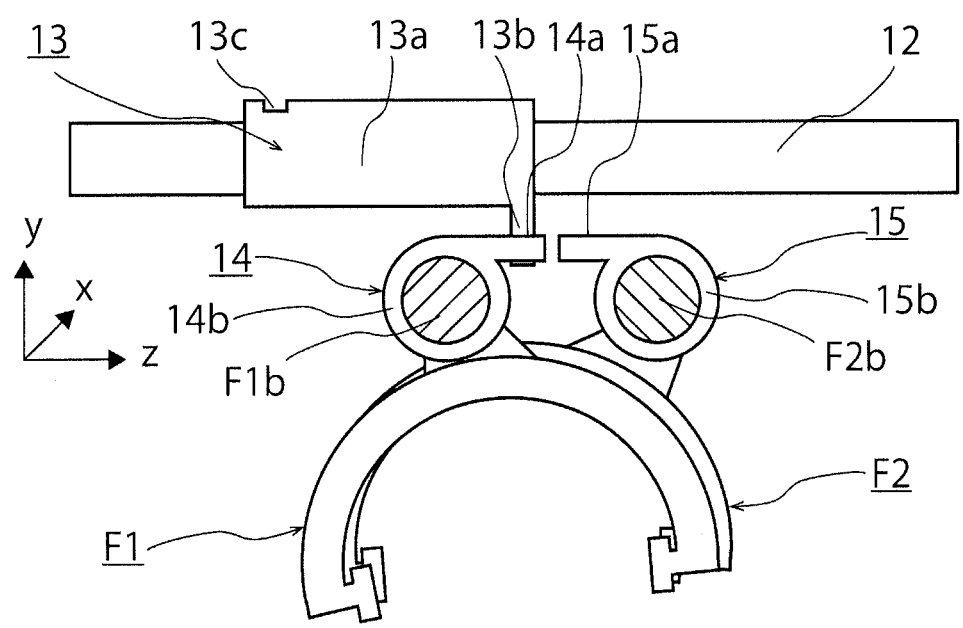
FIG. 3 is a side view showing a shift block of FIG. 2.

Here, a relation between the shift forks F1 and F2 and the shift mechanism 10 for main transmission will be explained with reference to FIG. 3. The shift select lever 13 is provided with: an arm insertion body 13a, an engagement lever 13b, and a concave portion 13c for selection. The arm insertion body 13a is formed into a cylindrical hollow shape so that the shift arm 12 can be inserted into an inside thereof. The engagement lever 13b is formed integrally with the arm insertion body 13a.

The first shift block 14 includes: a concave portion 14a for shifting which engages with the engagement lever 13b; and a shaft insertion body 14b formed in a cylindrical hollow shape so that a first shift shaft F1b can be inserted into an inside thereof. The second shift block 15 also has a similar configuration. Lacking parts of the concave portion 14a for shifting and the concave portion 15a for shifting of the shift blocks 14 and 15 are arranged so as to face each other, and the engagement lever 13b can move in a region where mutual recesses are combined at the time of select operation of the operation portion 50. Shaft insertion bodies 14b and 15b are coupled with shift shafts F1b and F2b, respectively, and are fixed so as to be unable to move above the shift shafts F1b and F2b.

The shift mechanism 10 for main transmission may just be a conventional one, and a configuration of the shift mechanism 10 is not limited to the above-described one as long as the shift fork F1 or F2 can be oscillated by the shift operation of the operation portion 50.

The cam mechanism 20 is, as shown in FIG. 2, provided with: a select operation input portion 21; a cam body 22; a first cam groove 23; and a second cam groove 24. In addition, the cam mechanism 20 is formed with a flat cam in which the first cam groove 23 and the second cam groove 24 have been provided in the cam body 22 formed in a flat shape. This cam mechanism 20 operates in the x-direction which is the vertical direction of FIG. 2, by the select operation of the operation portion 50.

The first cam groove 23 is the groove formed substantially into a Z shape at the cam body 22, and is provided with a position 23a for the gear stage GL and a position 23b for the gear stage GH. When a first guide member, which will be mentioned later, reaches this position 23a for the gear stage GL or position 23b for the gear stage GH, synchronous coupling of a coupling sleeve S3 and the gear stage GL or the gear stage GH is completed.

The second cam groove 24 is the groove formed into a zigzag shape at the cam body 22, and is provided with: a position 24a for a first shift block 14; a position 24b for a first shift block 15; a position 24c for a second shift block 14; and a position 24d for the second shift block 15. When a second guide member, which will be mentioned later, reaches these positions, there is completed engagement of the engagement lever 13b of the shift select lever 13 and the concave portion 14a for engagement of the shift block 14, or the concave portion 15a for engagement of the shift block 15. In addition, an inclination (angle) from the position 24a for the first shift block 14 of the second cam groove 24 to the position 24b for the first shift block 15, and an inclination (angle) from the position 24c for the second shift block 14 to the position 24d for the second shift block 15, are the same as each other.

A configuration of the cam mechanism 20 is not limited to the above-described one, a cam mechanism in which two cam grooves have been provided may be employed, and for example, a rotation-type (bobbin-type) cam mechanism may be employed. In addition, as long as arrangement of the positions 23a, 23b, and 24a to 24d which the first guide member or the second guide member reaches is respectively matched in the first cam groove 23 or the second cam groove 24, shapes thereof are not limited. Grooves having shapes in which the first guide member and the second guide member can smoothly slide may be preferably employed.

According to this configuration, the cam mechanism 20 provided with the two cam grooves 23 and 24 can be caused to operate by the select operation, and the shift mechanism 30 for transmission and the select mechanism 40 can be simultaneously caused to operate by the operation. Therefore, gear shifting operation of the multistage transmission 2 can be performed by operation of one shift lever. As a result, operability can be enhanced.

The shift mechanism 30 for auxiliary transmission is provided with: a first guide member 31; a first follower 32; an arm 33; a shift lever 34; and a third shift block 35. The first guide member 31 slides in the first cam groove 23, and the first follower 32 transmits the movement to the arm 33. The arm 33 is provided with a first turning portion 33a and a second turning portion 33b, and transmits operation of the first follower 32 in a z-direction which is a horizontal direction of FIG. 2, to the shift lever 34 by the turn of the first turning portion 33a and the second turning portion 33b. The shift lever 34 and a concave portion 35a of the third shift block 35 engage with each other, and thereby the shift fork F3 is oscillated in the x-direction.

According to this configuration, by the select operation of the operation portion 50, the shift mechanism 30 for auxiliary transmission operates in conjunction with the first cam groove 23 of the cam mechanism 20 that operates in the x-direction, and the gear stage GH or GL of the auxiliary transmission 4 can be shifted. Therefore, the multistage transmission 2 can be operated only by operation of one shift lever. As a result, a shift lever for auxiliary transmission and an electronic control device can be reduced, the device can be simplified, and cost can be made low. The above-described shift mechanism 30 for auxiliary transmission can operate in conjunction with the first cam groove 23, and if the shift fork F3 can be oscillated by the operation in conjunction with the first cam groove 23, a configuration of the shift mechanism 30 is not limited to the above-described one.

The select mechanism 40 is provided with: a second guide member 41; a second follower 42; an arm 43; and an engaging portion 44. The second guide member 41 slides in the second cam groove 24, and the second follower 42 transmits the movement to the arm 43. The arm 43 is provided with a turning portion 43a, and transmits operation of the second follower in the z-direction to the engaging portion 44 by the turning portion 43a. The engaging portion 44 and the concave portion 13c for selection engage with each other, and thereby the shift select lever 13 is moved in the z-direction. A configuration of this select mechanism 40 is not limited to the above-described one, the select mechanism 40 can just operate in conjunction with the second cam groove 24 to thereby move the shift select lever 13 in the z-direction.

Figure 4:
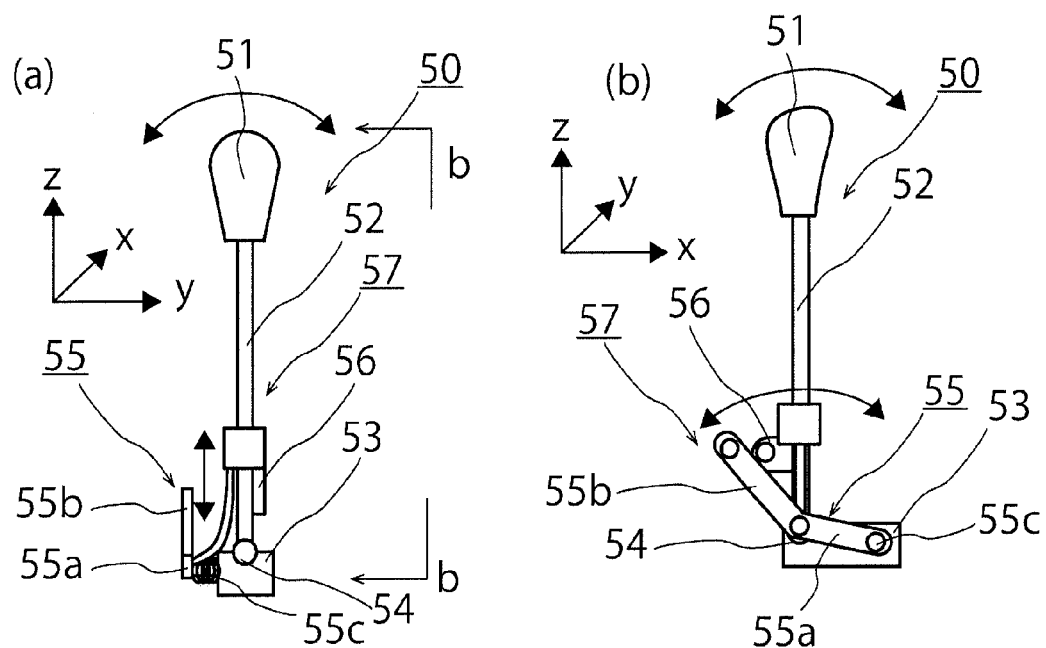
FIGS. 4 (a) and 4(b) are views showing a shift lever of FIG. 1.

The operation portion 50 is, as shown in FIGS. 4(a) and 4(b), provided with: a shift knob 51; a shift lever 52; a base 53; a spherical portion 54; and a select operation output member 55 and the shift operation output member 56 which make up an operation separating mechanism 57. A driver holds and operates the shift knob 51, and the shift lever 52 turns in the x and y-directions, with the spherical portion 54 rotatably provided at the base 53 in the vertical and horizontal directions and in the x and y-directions being set as an operation axis.

The select operation output member 55 is provided with: a link arm 55a; a turning shaft 55b; and a turn support portion 55c. The link arm 55a is formed into a doglegged shape. One end of the link arm 55a is pivotally supported by the turning shaft 55b, and the other end is connected to the push-pull cable C2 for selection. The turn support portion 55c is formed with an elastic body, one end thereof is joined to a bent portion of the link arm 55a, and the other end thereof is joined to the shift lever 52. In addition, the turning shaft 55b is also provided with a spring that biases the link arm 55a.

When the shift knob 51 is turned in the y-direction, a joining portion of the turn support portion 55c to the link arm 55a moves in the z-direction. Since pivotally supported by the turning shaft 55c, the link arm 55a turns by operation of the turn support portion 55c. Consequently, as shown in FIG. 4(a), the one end of the link arm 55a is displaced in the z-direction, and is displaced also in the x-direction. Meanwhile, when the shift knob 51 is turned in the x-direction, as shown in FIG. 4(b), the shift operation output member 56 turns in accordance with the turn, and is displaced tin the x-direction.

According to this configuration, operation of the shift lever 52 can be separated into shift operation and select operation, the shift mechanism 10 for main transmission is caused to operate by the shift operation, and the cam mechanism 20 can be caused to operate by the select operation, and thus the shifting of the gear stages of the main transmission 3 and the auxiliary transmission 4 can be operated by the one shift lever 52. As long as operation of the shift lever 52 can be separated into the shift operation and the select operation, a configuration of the operation portion 50 is not limited to the above-described one, and a conventional configuration can be used.

Figure 5:
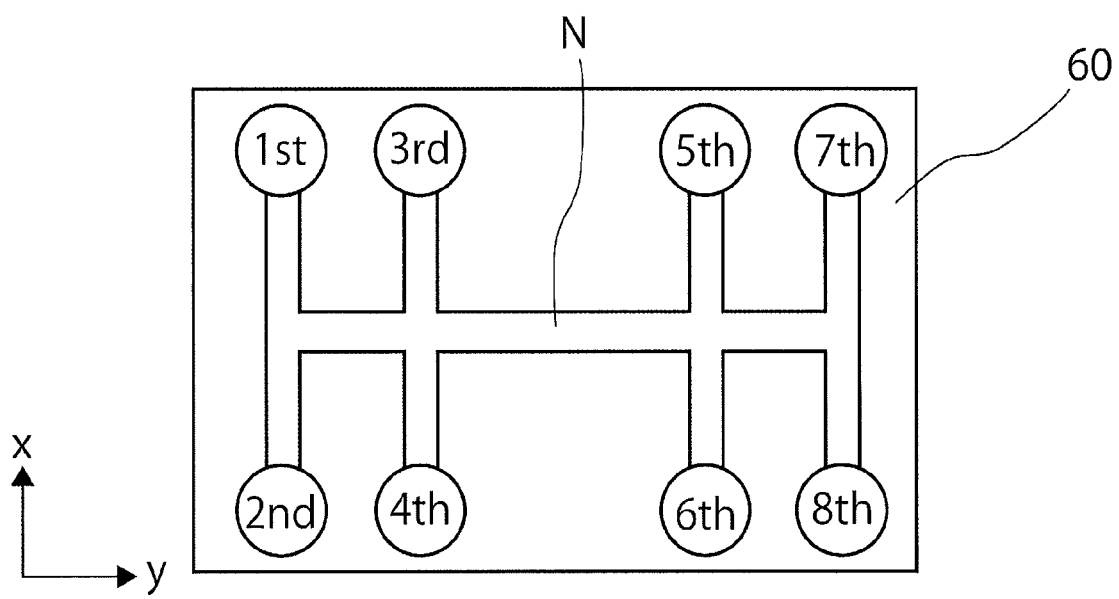
FIG. 5 is a diagram showing a shift pattern of FIG. 1.
Figure 6:
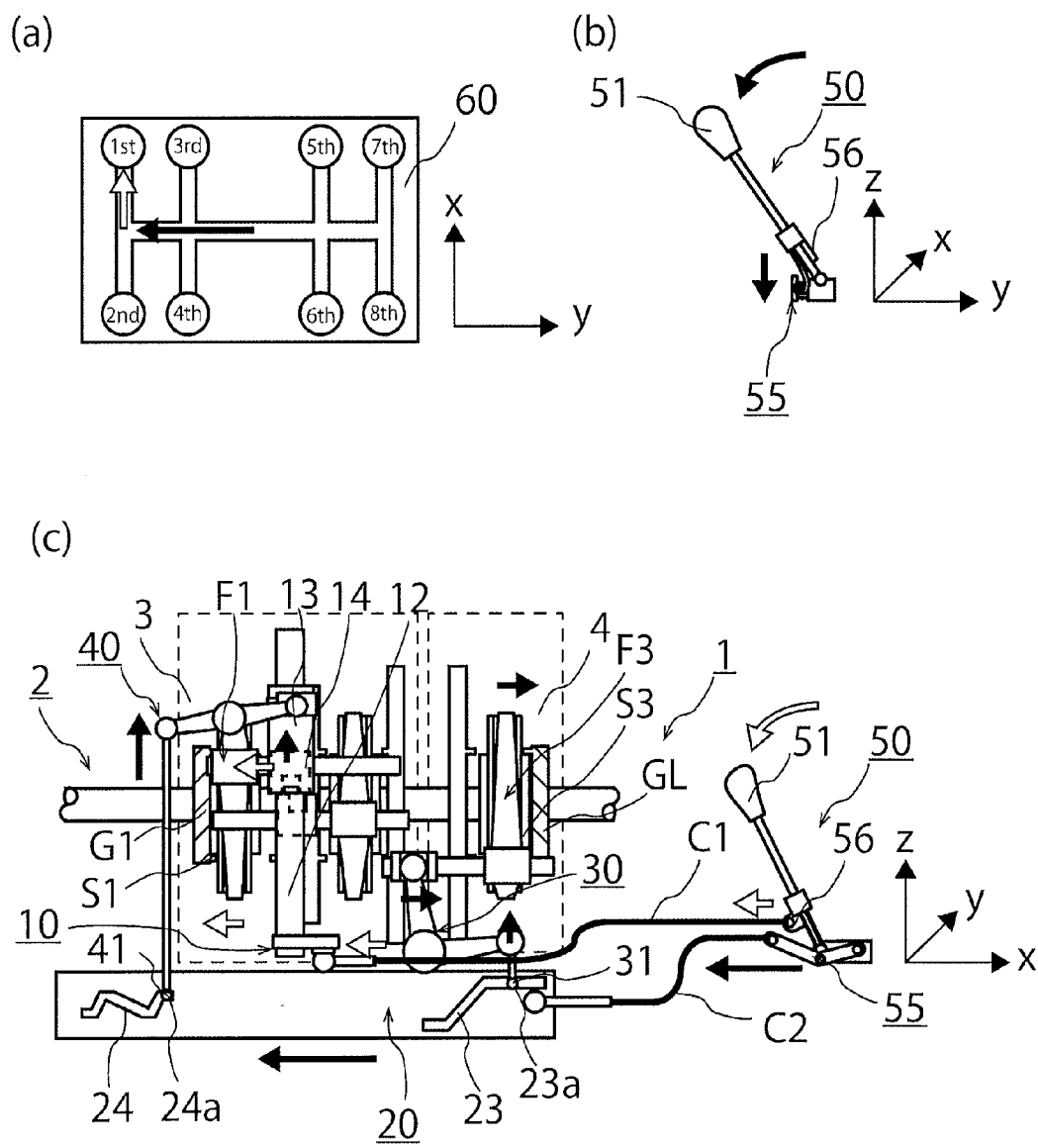
FIGS. 6(a) to 6(c) are a diagram and views showing a gear shifting method for shifting to a first-speed stage in a gear shifting operation device of the embodiment according to the present invention.
Figure 7:
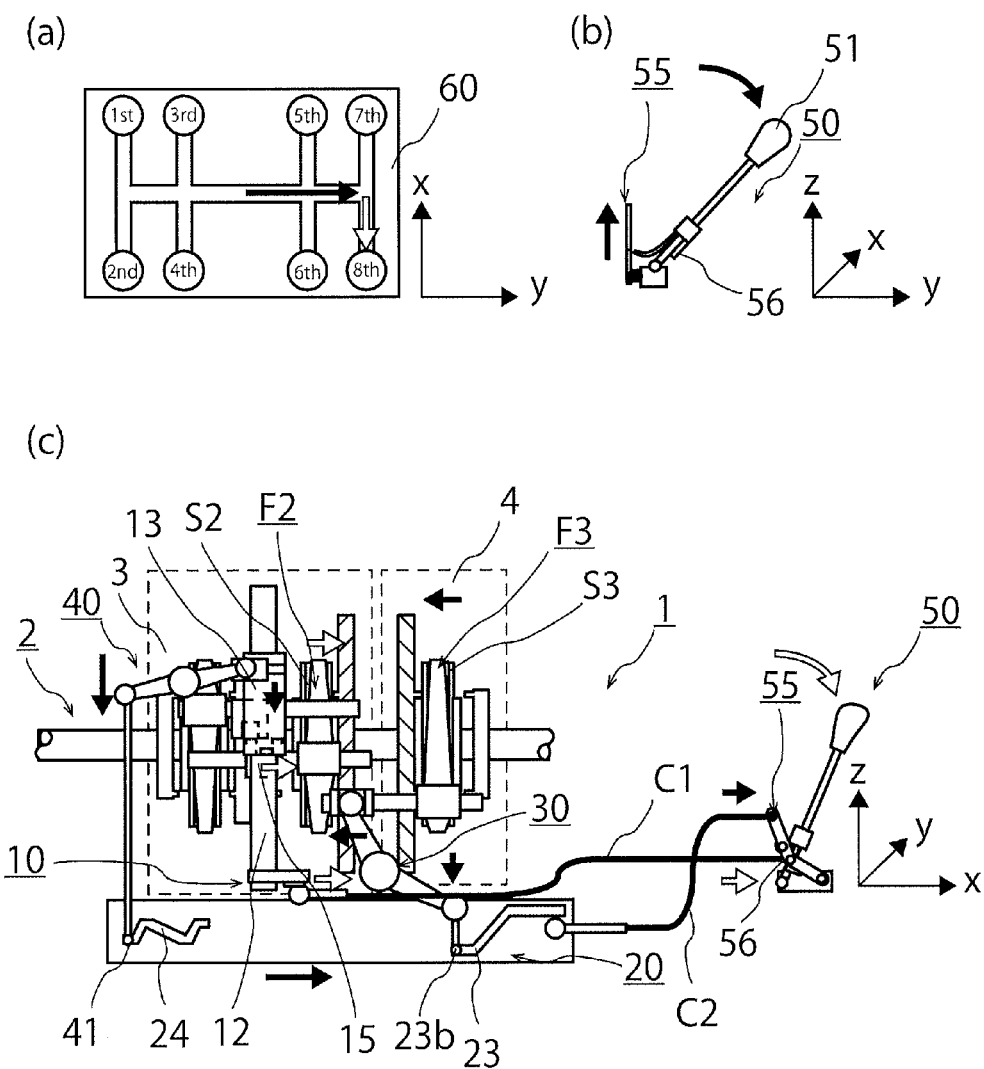
FIGS. 7(a) to 7(c) are a diagram and views showing the gear shifting method for shifting to an eighth-speed stage in the gear shifting operation device of the embodiment according to the present invention.

The shift pattern 60, as shown in FIG. 5, has a shift pattern in which two H shapes are linked to each other. Stages from a first-speed stage to an eighth-speed stage are assigned to end points of the respective shift patterns. Operation in the x-direction indicates the shift operation, and operation in the y-direction indicates the select operation. Although the shift pattern 60 has basically the H shape, a pattern branching from the H shape may be used when a gear shift stage is not an even stage but an odd stage. In addition, in a case of a multistage transmission of, for example, 12 speeds of 2×6, a shift pattern in which three H shapes are linked to one another can be used, and the number of H shapes is not limited. Furthermore, although the use of the H shape is common, separation of shift operation and select operation can just be performed, and thus a shape of the shift pattern is not also limited.

Next, operation of the gear shifting operation device 1 of the embodiment of the present invention will be explained with reference to FIGS. 6(a) to 6(c) and FIGS. 7(a) to 7(c). There will be explained the operation on the assumption that gear shift is performed from a neutral N as shown in FIG. 5. It should be noted that in FIGS. 5 to 7(c), arrows indicate select operation, and an outlined arrow indicates shift operation. Here, there will be explained gear shift to a first-speed stage in FIGS. 6(a) to 6(c) and gear shift to an eighth-speed stage in FIGS. 7(a) to 7(c). Only displacement directions are respectively different in gear shifting operation to other gear stage; the shift forks F1 to F3 to be oscillated, the coupling sleeves S1 to S3 to be synchronously coupled, and only the gear stages G1 to G4, and GL and GH are changed; operation of each mechanism does not change, and thus the explanation thereof is omitted.

Gear shift to the first-speed stage, as shown in FIG. 6(a), moves the shift knob 51 to a left-hand side of FIG. 6(a) in the y-direction. By this movement, the select operation output member 55 operates as shown in FIG. 6(b). As shown in FIG. 6(c), since the select operation output member 55 is displaced in the x-direction, a similar displacement in the x-direction is transmitted to the cam mechanism 20 by the push-pull cable C2 for selection, and the cam mechanism 20 is displaced to the left-hand side of FIG. 6(c) in the x-direction. Since the cam mechanism 20 moves to the left-hand side of the x-direction, the first cam groove 23 and the second cam groove 24 are similarly displaced. By this displacement, the first guide portion 31 moves to an upper part of FIG. 6(c) in the z-direction along the first cam groove, and is located at the position 23a for the gear stage GL. By the movement, the shift mechanism 30 for auxiliary transmission operates, the shift fork F3 is oscillated to the left-hand side of the x-direction, and the coupling sleeve S3 and the gear stage GL are synchronously coupled to each other. Meanwhile, the second guide portion 41 also moves to the upper part of the z-direction along the second cam groove 24, and is located at the position 24a for the first shift block 14. By the movement, the select mechanism 40 operates, the shift select lever 13 is moved to an upper part of the z-direction, and the engagement lever 13b and the first shift block 14 engage with each other.

Next, the shift knob 51 is moved to an upper part of the x-direction as shown in FIG. 6(a). By this movement, the shift operation output member 56 operates as shown in FIG. 6(c). Since the shift operation output member 56 is displaced in the x-direction, a similar displacement in the x-direction is transmitted to the shift mechanism 10 for main transmission by the push-pull cable C1 for shifting, and the shift mechanism 10 for main transmission is displaced to the left-hand side of FIG. 6(c) in the x-direction. As a result, the shift arm 12 operates on the left-hand side of the x-direction, and the shift fork F1 is oscillated to the left-hand side of the x-direction through the shift select lever 13 and the shift block 14. Therefore, the coupling sleeve S1 and the gear stage G1 are synchronously coupled to each other. With the above, gearshift to the first-speed stage is completed.

Gear shift to the eighth-speed stage, as shown in FIG. 7(a), moves the shift knob 51 to a right-hand side of FIG. 7(a) in the y-direction. By this movement, the select operation output member 55 operates as shown in FIG. 7(b). Next, as shown in FIG. 7(c), since the select operation output member 55 is displaced in the x-direction, similar displacement in the x-direction is transmitted to the cam mechanism 20 by the push-pull cable C2 for selection, and the cam mechanism 20 is displaced to a right-hand side of FIG. 7(c) in the x-direction. Since the cam mechanism 20 moves to the right-hand side of the x-direction, the first cam groove 23 and the second cam groove 24 are also similarly displaced. By this displacement, the first guide portion 31 moves to a lower part of FIG. 7(c) in the z-direction along the first cam groove, and is located at the position 23b for the gear stage GH. By the movement, the shift mechanism 30 for auxiliary transmission operates, the shift fork F3 is oscillated to the right-hand side of the x-direction, and the coupling sleeve S3 and the gear stage GH are synchronously coupled to each other. Meanwhile, the second guide portion 41 also moves to a lower part of the z-direction along the second cam groove 24, and is located at the position 24d for the second shift block 15. By the movement, the select mechanism 40 operates, the shift select lever 13 is moved to the lower part of the z-direction, and the engagement lever 13b and the second shift block 15 engage with each other.

Next, the shift knob 51 is moved to a lower part of the x-direction as shown in FIG. 7(a). By this movement, the shift operation output member 56 operates as shown in FIG. 7(c). Since the shift operation output member 56 is displaced in the x-direction, a similar displacement in the x-direction is transmitted to the shift mechanism 10 for main transmission by the push-pull cable C1 for shifting, and the shift mechanism 10 for main transmission is displaced to the right-hand side of FIG. 7(c) in the x-direction. As a result, the shift arm 12 operates on the right-hand side of the x-direction, and the shift fork F2 is oscillated to the right-hand side of the x-direction via the shift select lever 13 and the shift block 15. Therefore, the coupling sleeve S2 and the gear stage G4 are synchronously coupled to each other. With the above, gear shift to the eighth-speed stage is completed.

According to the above operation, one shift lever 52 is operated along the conventional shift pattern 60, and thereby shift of the gear stages G1 to G4 of the main transmission 3, and shift of the gear stages GL and GH of the auxiliary transmission 4 can be mechanically performed. Particularly, by select operation of the shift lever 52, the first cam groove 23 and the second cam groove 24 simultaneously move, and the shift mechanism 30 for auxiliary transmission and the select mechanism 40 for main transmission can be simultaneously caused to operate. As a result, a select operation direction of the main transmission 3 is reversed simultaneously when the gear is shifted in the auxiliary transmission 4. That is, the shift fork F1 for low-speed side (the gear stages G1 and G2) of the main transmission 3 is selected at the time of shift-up (shift from the gear stage GL to the gear stage GH) of the auxiliary transmission 4, and the shift fork F2 for high-speed side (the gear stages G3 and G4) of the main transmission 3 is selected at the time of shift-down (shift from the gear stage GH to the gear stage GL) of the auxiliary transmission 4. Therefore, operability can be enhanced. In addition, complicated electronic control and the like are not required.

Generally in shift operation, after select operation is performed, shift operation is performed. According to the above-described operation, since gear shifting operation of the auxiliary transmission 4 is performed in the select operation before the shift operation is performed, skip shift from, for example, the first-speed stage to a fifth-speed stage can be performed, and the driver can arbitrarily perform gear shifting operation.

Since in a gear shifting operation device of a multistage transmission of the present invention, gear stages of a main transmission and an auxiliary transmission can be mechanically shifted by operation of one shift lever without the need for complicated electronic control and device, operability can be enhanced. Therefore, the gear shifting operation device can be utilized for large vehicles such as a track having a multistage transmission mounted thereon in order to achieve low fuel consumption.

The invention claimed is:

1. A gear shifting operation device of a multistage transmission that is provided with a main transmission and an auxiliary transmission, and shifts gear stages of both the main transmission and the auxiliary transmission, comprising:

an operation separating mechanism that separates operation by one shift lever into a shift operation and a select operation;

a select operation mechanism that operates by the select operation, selects a target shift fork for the main transmission from among a plurality of shift forks for the main transmission, and shifts a shift fork for the auxiliary transmission; and a shift operation mechanism that operates by the shift operation, and shifts the target shift fork for the main transmission selected by the select operation, wherein the select operation mechanism is provided with:
a unit operating a select mechanism that selects the target shift fork for the main transmission from among the plurality of shift forks for the main transmission, and
a unit operating a shift mechanism that shifts the shift fork for the auxiliary transmission, and wherein the select operation mechanism is configured to simultaneously actuate the unit operating the select mechanism and the unit operating the shift mechanism so that when the shift fork for the auxiliary transmission is shifted to a gear stage of a high-speed side, the shift fork for the main transmission used for a gear stage of a low-speed side is selected, and when the shift fork for auxiliary transmission is shifted to a gear stage of a low-speed side, the shift fork for the main transmission used for the gear stage of a high-speed side is selected.

2. The gear shifting operation device of the multistage transmission according to claim 1 wherein
the select operation mechanism includes a cam mechanism, and is provided with: a first cam groove that causes the cam mechanism to operate the shift mechanism for the auxiliary transmission that shifts the shift fork for the auxiliary transmission; and a second cam groove that causes the cam mechanism to operate the select mechanism that selects the target shift fork for the main transmission.

3. A vehicle having mounted thereon the gear shifting operation device of the multistage transmission according to claim 2.

4. A vehicle having mounted thereon the gear shifting operation device of the multistage transmission according to claim 1.

* * * * *